United States Patent
Hawley et al.

(10) Patent No.: US 7,949,952 B2
(45) Date of Patent: May 24, 2011

(54) METHOD AND SYSTEM FOR PROVIDING USER REPRESENTATIONS IN REAL-TIME COLLABORATION SESSION PARTICIPANT LISTS REFLECTING EXTERNAL COMMUNICATIONS TOGETHER WITH USER REPRESENTATIONS IN EXTERNAL COMMUNICATION APPLICATIONS INDICATING CURRENT REAL-TIME COLLABORATION SESSION PARTICIPATION

(75) Inventors: J. Christopher Hawley, Chelmsford, MA (US); Fang Lu, Billerica, MA (US); Corinne M. Ryan, Westford, MA (US); Weichuan Dong, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 11/768,394

(22) Filed: Jun. 26, 2007

(65) Prior Publication Data
US 2009/0006980 A1    Jan. 1, 2009

(51) Int. Cl.
*G06F 3/00* (2006.01)
(52) U.S. Cl. ........ 715/751; 715/753; 715/758; 715/752; 715/810; 709/204
(58) Field of Classification Search .................. 715/751, 715/752, 753, 758, 764, 765, 835, 846, 810; 709/204, 205
See application file for complete search history.

(56) References Cited

U.S. PATENT DOCUMENTS

| | | | |
|---|---|---|---|
| 6,876,734 B1 | 4/2005 | Summers | |
| 6,947,571 B1 | 9/2005 | Rhoads | |
| 6,961,416 B1 | 11/2005 | Summers | |
| 6,976,017 B1 | 12/2005 | Getchius | |
| 6,996,073 B2 | 2/2006 | West | |
| 7,006,614 B2 | 2/2006 | Feinberg | |
| 7,007,067 B1 | 2/2006 | Azvine | |
| 7,010,530 B2 | 3/2006 | Bartkowiak | |
| 7,028,228 B1 | 4/2006 | Lovy | |
| 7,028,262 B2 | 4/2006 | Estrada | |
| 7,028,303 B2 | 4/2006 | Lahey | |
| 7,421,660 B2 * | 9/2008 | Charnock et al. | 715/751 |
| 2001/0030664 A1 | 10/2001 | Shulman | |
| 2002/0143877 A1 * | 10/2002 | Hackbarth et al. | 709/205 |
| 2003/0063121 A1 * | 4/2003 | Kumhyr et al. | 345/751 |
| 2003/0210265 A1 * | 11/2003 | Haimberg | 345/758 |
| 2004/0172455 A1 * | 9/2004 | Green et al. | 709/207 |
| 2004/0174392 A1 * | 9/2004 | Bjoernsen et al. | 345/751 |
| 2005/0055639 A1 | 3/2005 | Fogg | |
| 2005/0166154 A1 * | 7/2005 | Wilson et al. | 715/751 |
| 2006/0174207 A1 * | 8/2006 | Deshpande | 715/758 |
| 2008/0005685 A1 * | 1/2008 | Drews et al. | 715/764 |
| 2008/0147803 A1 * | 6/2008 | Krzyzanowski et al. | 709/206 |
| 2008/0256107 A1 * | 10/2008 | Banga et al. | 707/102 |

FOREIGN PATENT DOCUMENTS
WO    WO2006/039076 A2    4/2006

* cited by examiner

*Primary Examiner* — Xiomar Bautista
(74) *Attorney, Agent, or Firm* — David A. Dagg

(57) ABSTRACT

A system for providing user representations in real-time collaboration application participant lists reflecting external communications, together with user representations in external communication applications indicating current real-time collaboration session participation. A participant list in a collaboration session represents other participants with whom the local user has recently or frequently communicated in a visually separate area. User representations associated with messages, entries, or the like, and contained in applications external to the collaboration application are displayed in a way that visually indicates the user's current participation in a collaboration session.

16 Claims, 8 Drawing Sheets

FIG. 2
PRIOR ART

| In Collab Session? | Who ^ | ^ Date ▼ | Time | ^ | Subject ^ |
|---|---|---|---|---|---|
| | Nick Jones | 06/27/2006 | 01:14 PM | ▨ | Re: Changing Te |
| | service@paypal. | 06/27/2006 | 12:38 PM | ▨ | Receipt for your |
| | Bob Olsen | 06/27/2006 | 12:06 PM | ▨ | Confirmed: Mass |
| | John Smith2 | 06/27/2006 | 10:10 AM | ▨ | Re: Changing Te |
| | John Smith13 | 06/27/2006 | 10:07 AM | ▨ | Accepted: Catch |
| | Fred Linski | 06/27/2006 | 10:04 AM | ▨ | Fw: Catch up on |
| | John Smith12 | 06/27/2006 | 10:02 AM | ○ | Request update: |
| | Paul Sugarman | 06/27/2006 | 09:39 AM | ▨ | Fw: Additional W |
| | Mike Paulson | 06/27/2006 | 09:32 AM | ▨ | Accepted: Catch |
| | John Smith22 | 06/27/2006 | 09:22 AM | ▨ | D&D meeting... |

FIG. 8

| 9:00 | CAM920079999 |
| | 1537 - Memphis - PictureTel Video Available |

09:00 AM - 10:00 AM CAM920079999
1537 - Memphis - PictureTel Video Available
Memphis Toll-free dial-in: 1-999-999-9999 Toll dial in: 1-770-615-9999 Tie-line dial in: 421-9999
passcode 999999
Bob Ryan — 132

| Required: | Bob_Ryan@xyz.us.com, | doug@newlaw.com, | haaron@xyz.com | bbonds@xyz.com |

Time zones: This entry was created in a different time zone. The time in that zone is: Thu May 24, 2007 9:00 AM EDT - 10:00 AM EDT 140  139  144  142

*FIG. 11*

METHOD AND SYSTEM FOR PROVIDING USER REPRESENTATIONS IN REAL-TIME COLLABORATION SESSION PARTICIPANT LISTS REFLECTING EXTERNAL COMMUNICATIONS TOGETHER WITH USER REPRESENTATIONS IN EXTERNAL COMMUNICATION APPLICATIONS INDICATING CURRENT REAL-TIME COLLABORATION SESSION PARTICIPATION

FIELD OF THE INVENTION

The present invention relates generally to computer based communication and collaboration applications, and more specifically to a method and system for providing user representations in real-time collaboration application participant lists reflecting external communications, together with user representations in external communication applications indicating current real-time collaboration session participation.

BACKGROUND OF THE INVENTION

In the area of computer-based technologies, real-time collaboration applications have become increasingly common and relied on in many contexts. One popular example of a real-time collaboration application is Web conferencing. A Web conference may be thought of as a "live" or "synchronous" videoconference session held via the Internet. In a Web conference, attendees interact with other participants in real-time using a Web application or an application downloaded onto their respective client systems. Web conferencing offers advantages over traditional room-based videoconferencing because applications such as collaborative Web browsing, file transfer and application sharing are easily supported over the Internet for a globally distributed workforce.

As Web conferencing has become widely adopted, the size of many Web conferences has greatly increased. A given Web conference may have hundreds of participants listed as current attendees. With such large participant lists, existing user interface constructs result in most of the participants in the list being hidden, since only a relatively small subset of the complete list is viewable at any one time. This becomes a problem when a user wishes to find one or more other users that they know or have collaborated with in a potentially lengthy list of participants. For example, a user may wish to find the list entry for another user in the session participant list with whom they have recently communicated via another application, but without leaving the collaboration session user interface. This scenario is fairly likely, since other users with whom a user communicates with are more likely to be of interest than others with whom they have not communicated with. Additionally, the entries in a participant list for a collaboration session may be "live" in the sense that external communications, e.g. chat sessions, e-mail, etc., can be initiated through them, for example through a context menu or the like. Accordingly, the participant lists for existing systems are cumbersome and time consuming in that they may require a user to scroll through potentially large numbers of participants in order to find the entry for another participant of interest. Moreover, existing participant lists for collaboration application include no indications of whether participants have recently and/or frequently communicated with the local user, for example through one or more other communication applications. Such information would be desirable to have in order to quickly determine persons of interest within such participant lists.

Another problem with existing systems involves the representations of messages in applications external to collaboration applications. Specifically, in existing message lists for applications external to collaboration applications, there is no way for the local user to quickly locate messages associated with (e.g. received from) other participants in a current collaboration session. In situations where a user is primarily concerned with activities related to a current collaboration session, they are likely to want to quickly be able to access messages related to that collaboration session, even in applications external to the collaboration application. For example, a user may wish to quickly locate messages in their e-mail Inbox received from other participants in a current collaboration. Unfortunately, using existing systems, the user is often forced to locate such messages by scrolling or searching the messages in the list based on the names of the users that sent such messages. This is time consuming and disruptive to the way the user would like to work.

Some existing systems have enabled a user to find all e-mail messages, meetings and instant messaging sessions associated with another user, based on the other person's name. While an invitation to a collaboration session may be part of the list generated using such a system, there is no way for the user to quickly discern whether another user is currently participating in the session.

In one existing Web conferencing system, a user is enabled to open a participant list in a new window of the user interface. However, such a system still requires the user to sift through all the current conference attendees, then separately access an external communication application (e.g. e-mail) and match messages with the contents of the participant list in order to identify relevant messages in the external application.

For these reasons it would be desirable to have a new system for providing a participant list for a collaboration session that makes it easier for a user to determine other users of importance, for example based on recent communications with those users. The system should further enable a user to quickly and conveniently determine which messages in a message list are associated with other users with whom they are currently participating in a collaboration session.

SUMMARY OF THE INVENTION

In order to address the above described and other shortcomings of previous techniques, a new method and system are disclosed for providing user representations in real-time collaboration application participant lists reflecting external communications, together with user representations in external communication applications indicating current real-time collaboration session participation. In a first aspect of the disclosed system, a list of participants in a collaboration session is presented such that other participants with whom the local user has recently or frequently communicated with are represented by entries in a visually separate area of the user interface. In one embodiment, the separate representation of such other users is placed at the top of the participant list. The participants contained in the separate representation may either also be contained in the main portion of the participant list, or only listed in the separate participant representation (i.e. removed from the main portion of the participant list). In one embodiment, time information or other information regarding a last communication with the participant may be accessed through a tool tip or the like displayed in proximity (e.g. adjacent to) the participant name of the participant entries in the separate representation.

In another aspect of the disclosed system, the user representations associated with messages, entries, or the like, contained in applications external to the collaboration application are displayed in a way that visually indicates the user's current participation in a collaboration session. In one embodiment, such visual indication is provided as a separate icon or the like indicating current session participation of a user associated with a message, entry, or the like. Alternatively, a visual modification to an icon, name, or the like may be performed to indicate the current session participation of the user.

Thus there is disclosed a new system for providing a participant list for a collaboration session that makes it easier for a user to determine other users of importance, for example based on recent communications with those users. The disclosed system also enables a user to quickly and conveniently determine which messages or entries in a list or other structure provided external to the collaboration application are associated with other users with whom the local user is currently participating in a collaboration session.

The disclosed system advantageously identifies and visually indicates those collaboration session participants that a local user is likely to be interested in, and informs the local user of other applications that have facilitated other collaborations with those session participants. The disclosed system is also advantageous in that it is bi-directional with regard to such other applications, such that visual indications of current collaboration session participation is also provided in those applications as well. In this way, the disclosed system helps build networks and relationships between users, since a user can now conveniently see a relationship between themselves and another user who communicated with them in the past, and who is now a fellow participant in a collaboration session. The disclosed system thus gives the user an opportunity to conveniently reconnect with other users, and enhances their awareness of relationships with others in a group or organization. The disclosed system effectively links awareness of other users between a current collaboration session and other applications external to the collaboration session application to provide an enhanced user experience in both the current collaboration session application and the other applications.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2 is a simplified screen shot showing a list of message entries displayed by a previous electronic mail mailbox user interface;

FIG. 8 is a simplified screen shot showing a user interface for an electronic mail application in an illustrative embodiment;

FIG. 10 is a simplified screen shot showing an entry from within a list of calendar entries in an electronic calendar application user interface; and FIG. 11 is a simplified screen shot showing an entry from within a list of calendar entries in an electronic calendar application user interface.

DETAILED DESCRIPTION OF EXEMPLARY EMBODIMENTS

Figure 1:
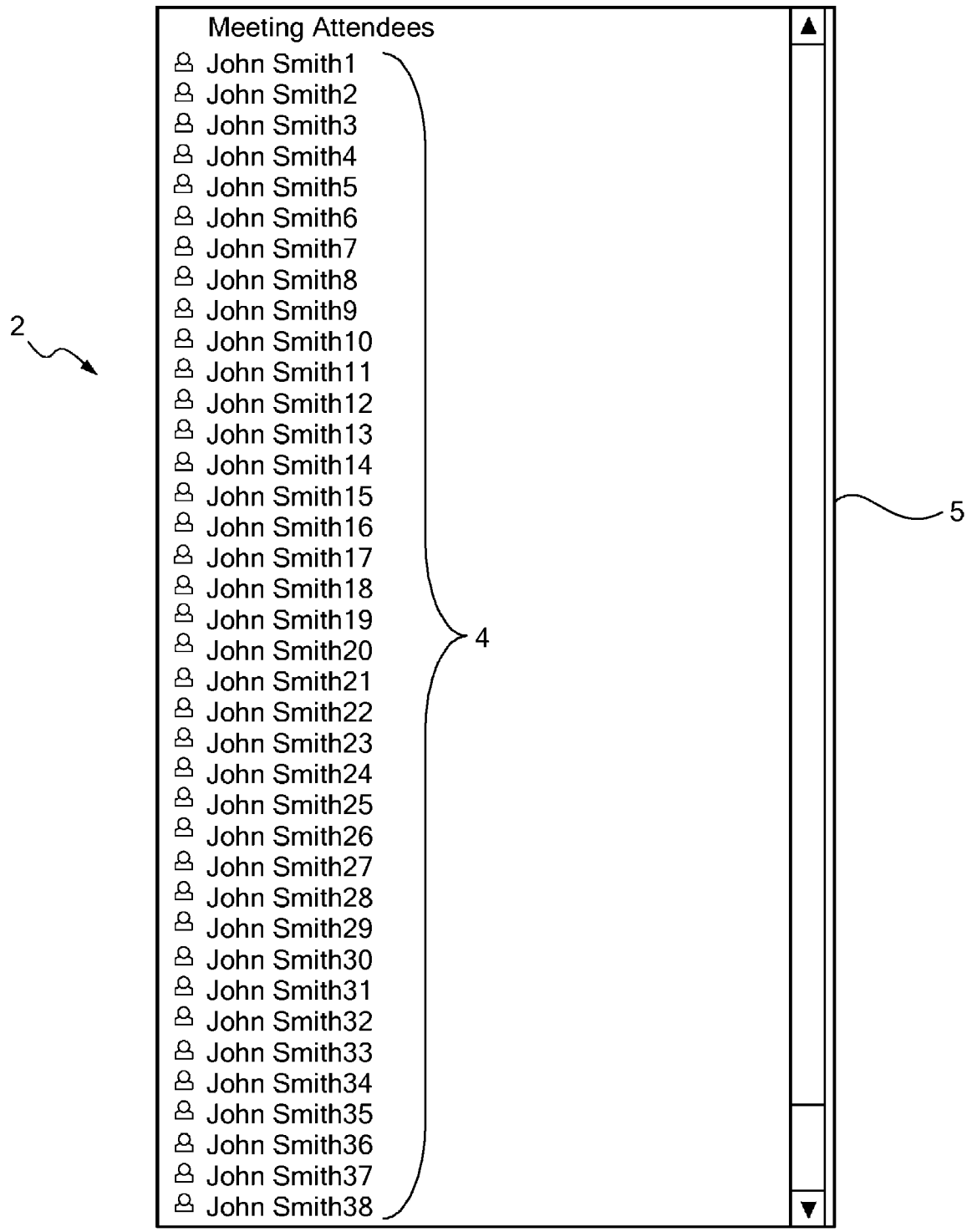
FIG. 1 is a simplified screen shot showing a participant list for a collaboration session as provided by a previous solution.

As shown in FIG. 1, a previous solution provides participant list 2 that displays participant entries 4. Each of the participant entries 4 corresponds to a user that is currently participating in a collaboration session. The example of FIG. 1 illustrates the difficulty in using previous techniques to identify those current participants in a collaboration session that a local user may wish to communicate with. Since there is no indication of whether or how any of the users corresponding to the entries 4 have communicated with the local user viewing the participant list 2, the local user cannot conveniently identify other participants that the local user may be in frequent contact with. Moreover, since only a subset of the participants is shown at any given time, the local user must scroll through the collaboration participants using the scroll bar 5 in order to determine whether a specific other user with whom the local user is in frequent contact is a current participant in the collaboration session.

Figure 2:
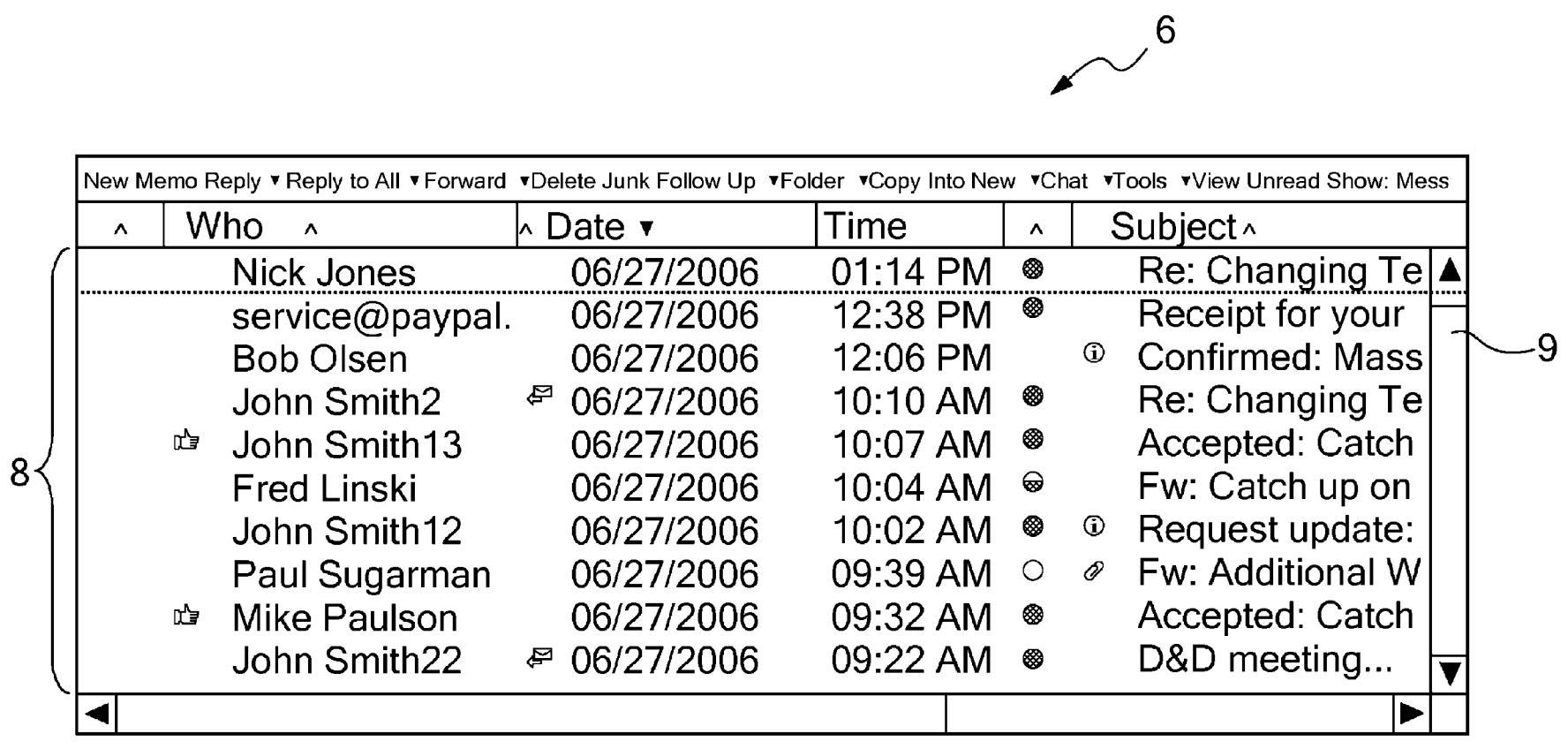

FIG. 2 is an electronic mail mailbox user interface 6 including a list of entries 8 corresponding to electronic mail messages stored in the mail box. As shown in FIG. 2, the entries 8 include no information that would allow the local user to determine whether the other users associated with the messages represented by the entries 8 are currently participating in a collaboration session with the local user. As a result, the local user must use the scroll bar 9 to manually search through the list of entries 8 in order to find the user names of users that the local user previously determined were participating in the collaboration session by way of the participant list 2 shown in FIG. 1. This manual process is time consuming and likely to be inaccurate or incomplete.

Figure 3:
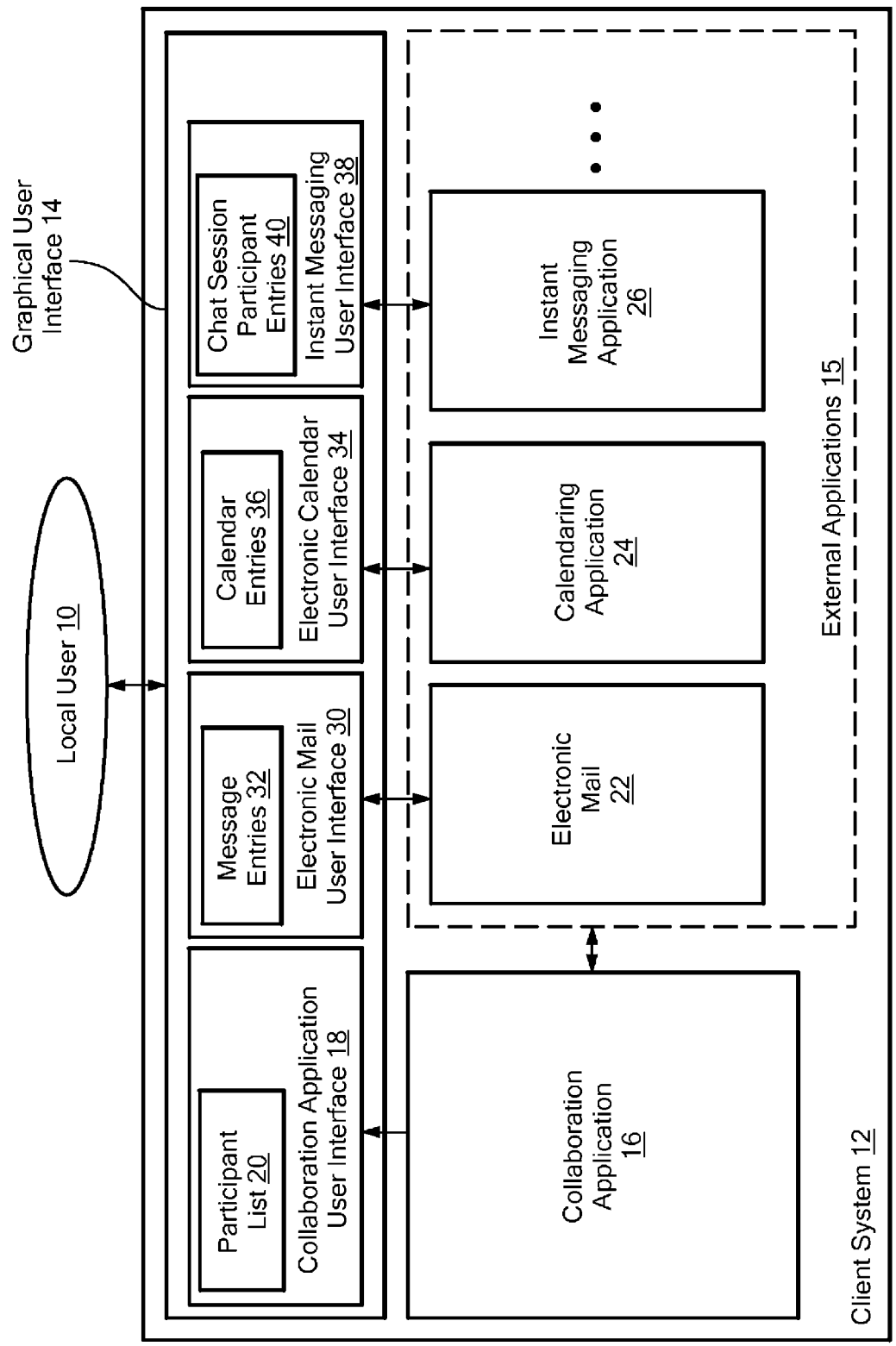
FIG. 3 is a block diagram showing software, firmware and/or hardware components in an illustrative embodiment of the disclosed system.

As shown in FIG. 3, an illustrative embodiment of the disclosed system provides a local user 10 of a client system 12 with a graphical user interface 14. The client system 12 may be any specific type of a computer system or intelligent electronic device, such as a desktop, laptop, or palmtop computer system, or a personal digital assistant, cell phone, or other electronic device. The client system 12 includes or controls a display device capable of displaying the graphical user interface 14 to the local user 10, such as a liquid crystal display (LCD), cathode ray tube (CRT), interferometric modulator display (IMOD), light emitting diode (LED), or the like.

A collaboration application 16 generates a collaboration application user interface 18 including a participant list 20 within the graphical user interface 14. The collaboration application 16 may be any specific type of collaboration system through which users of disparately client systems can form collaboration sessions during which information can be exchanged between session participants in real time. Such real time collaboration systems include Web conferencing systems that provide video conferencing over the Internet to potentially large numbers of session participants simultaneously. Other types of collaboration sessions provided by the collaboration application 16 include non-real time collaboration systems, through which participants asynchronously enter and read session contents. Such asynchronous collaboration sessions include on-line forums, discussion groups, and the like.

The collaboration application user interface 18 enables collaboration session participants, such as the local user 10, to enter and read contents of the collaboration session (e.g. Web conference). The participant list 20 within the collaboration application user interface 18 includes a list of entries, where each entry represents a user that is currently a participant in the collaboration session provided by the collaboration application 16. Session participants represented in the participant list 20 may, for example, be required to be invited, log in or otherwise be authenticated in order to join the collaboration session. As described further below, the participant list 20 is visually organized so that entries for session participants that have communicated with the local user 10 through one or more of the external applications 15 are separately displayed such that they can be easily located by the local user 10.

The external applications 15 are applications other than the collaboration application 16 though which the local user 10 can communicate with other users. For example, as shown in FIG. 3, the external applications 15 include electronic mail 22, an electronic calendaring application 24, an instant messaging application 26, and potentially other communication applications. The electronic mail application 22 generates the electronic mail user interface 30 including message entries 32. The electronic mail user interface 30 enables the local user to compose and send electronic mail messages to other users, and to read electronic mail messages received from other users. The message entries 32 may, for example, be present to the local user 10 as part of an Inbox user interface mailbox construct displaying entries corresponding to received messages, and/or as part of a Sent Items user interface mailbox construct displaying entries corresponding to previously sent messages, and/or any other specific type of mailbox construct. Each entry in the message entries 32 corresponds to an electronic mail message.

The calendaring application 24 generates the electronic calendar user interface 34, through which the user can access calendar entries corresponding to dates, times, or events scheduled at specific dates and/or times. Events that can be scheduled through the electronic calendar user interface 34 include meetings, teleconferences, videoconferences (e.g. Web conferences), etc. Each of the calendar entries 36 represents a date, time, or scheduled event, and may include a list of meeting attendees, an indication of a user that scheduled a meeting or other event, and/or other information regarding the corresponding date, time or scheduled event.

The instant messaging application 26 generates the instant messaging user interface 38 including chat session participant entries 40. The instant messaging application 26 enables the local user 10 to participate in chat sessions with other users. The instant messaging user interface 38 enables the local user to enter and read the contents of such chat sessions, and the chat session participant entries 40 is a list of entries corresponding to users participating in one or more chat sessions with the local user 10 through the instant messaging application 26.

As further described below, the message entries 32, calendar entries 36, and/or chat session participant entries 40 are displayed with visual indications of whether the corresponding user for each given entry is currently participating along with the local user 10 in a collaboration session provided by the collaboration application 16. Additionally, the message entries 32, calendar entries 36 and/or chat session participant entries 40 may be ordered or otherwise organized by the local user 10 such that those entries for users that are currently participants with the local user 10 in a collaboration session provided by the collaboration application 16 are collected together in visual proximity (e.g. a separate list or sub-list of entries for current collaboration session participants).

During operation of the embodiment shown in FIG. 3, information regarding collaboration session participation (i.e. identities of current collaboration session participants, events indicating specific users joining or leaving the collaboration session, etc.) is passed from the collaboration session application 16 to the external applications 15. Such collaboration session participation information may be proved either directly from the collaboration session application 16 to the external applications 15, or alternatively over a communication network from a remote application server system on which such information is collected in cooperation with or on behalf of the collaboration application 16. Similarly, information regarding communications of the local user with other users through the external applications 15 (i.e. electronic mail message times and dates, total number of electronic mail messages with respective users, number of calendar events, times, dates and number of chat sessions, etc.) is passed from the external applications 15 to the collaboration application 16, either directly from the external applications 15, or alternatively over a communication network from remote application server systems on which such information is collected in cooperation with or on behalf of the respective external applications 15.

Those skilled in the art will recognize that the collaboration application 16 and external applications 15 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the client system 12 may include one or more processors, and program storage, such as memory, for storing program code executable on such processors, as well as input/output devices and/or interfaces. The client system 12 is further interconnected to a computer or data communication network (e.g. the Internet, a Local Area Network, etc.) through one or more of such input/output devices or interfaces, through which is provided communication to a number of other client systems and/or a number of server systems.

Figure 4:
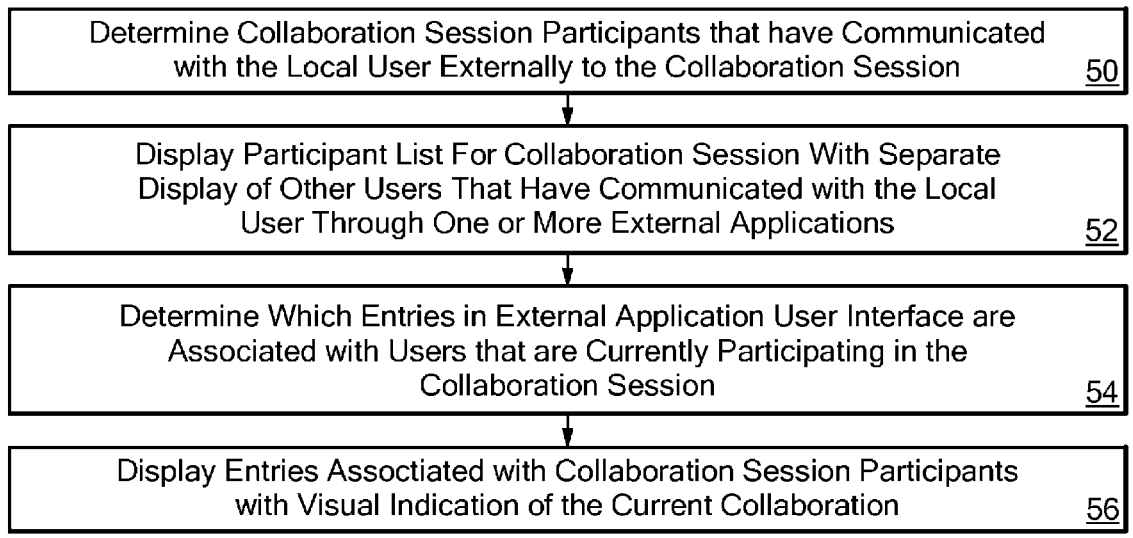
FIG. 4 is a flow chart showing steps performed during operation of an illustrative embodiment of the disclosed system.

FIG. 4 is a flow chart showing steps performed during operation of an illustrative embodiment of the disclosed system. As shown in FIG. 4, at step 50 the disclosed system operates to determine collaboration session participant that have communicated with the local user through an application external to the collaboration application providing the collaboration session. For example, the disclosed system may operate at step 50 determine which of the current session participants have recently (e.g. within some predetermined number of days, weeks, etc.) communicated with the local user through an electronic mail application, which of the current session participants are associated with one or more of the local user's recent electronic calendar entries, which of the current session participants have recently participated in one or more chat sessions with the local user, etc. The disclosed system may embodied such that the set of current session participants that have recently communicated with the local user through an application external to the collaboration application is modified in response to each newly detected communication. For example, an electronic mail message received by the local user would immediately cause the sender of that electronic mail message to added to the set of current collaboration session participants with whom the local user has recently externally communicated if that sending user is a current session participant, and the sending user were not previously contained in the set.

At step 52, the disclosed system displays the participant list for the current collaboration session with a separate display area for those session participants that were determined to have recently communicated with the local user externally to the collaboration application at step 50. For example, the set of current session participants with whom the local user has recently communicated with externally to the collaboration application could be displayed at a topmost portion of the participant list. Alternatively, a separate display area or window could be generated to display the session participants that have recently communicated with the local user externally to the collaboration application.

At step 54, the disclosed system determines which entries in one or more user interfaces for applications external to the collaboration application are associated with users that are currently participating in the collaboration session. As noted above, such entries may include message entries in an electronic mail user interface, calendar entries in a calendaring application user interface, chat session participant entries in an instant messaging session application user interface, etc. Accordingly, other users associated with such entries include senders of electronic mail messages to the local user, receivers of electronic mail messages from the local user, meeting invitees/attendees of meeting entries in the local user's electronic calendar, other users with whom the local user has had an instant messaging session, etc.

At step 56, the disclosed system displays entries within the external application user interfaces associated with current collaboration session participants in a visually distinct way. For example, the user names of current collaboration session participants may have a specific icon displayed next to them within the user interfaces of the external applications. Such an icon or other visual indicator provides a convenient way for the local user to identify which entries in the external application user interfaces are associated with users that are current participants in the collaboration session.

Figure 5:
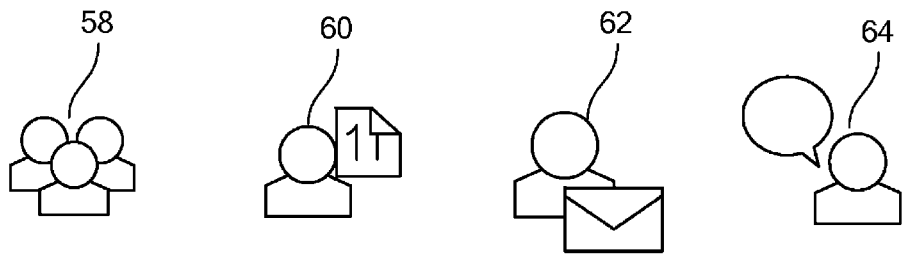
FIG. 5 shows examples of icons used in an illustrative embodiment.

FIG. 5 shows examples of icons used in an illustrative embodiment. The icon 58 is an example of an icon that may be displayed in proximity to entries in external application user interfaces to indicate that a user associated with that entry is currently a participant in a collaboration session with the local user. The icon 60 is an example of an icon that may be displayed in proximity to an entry in the participant list for a collaboration session indicating that the user corresponding to that participant list entry is also an invitee to a meeting that the local user has scheduled in his or her electronic calendaring application. The icon 62 is an example of an icon that may be displayed in proximity to an entry in the participant list for a collaboration session indicating that the user corresponding to that participant list entry has communicated with the local user through an electronic mail application. The icon 64 is an example of an icon that may be displayed in proximity to an entry in the participant list for a collaboration session indicating that the user corresponding to that participant list entry has communicated with the local user through an instant messaging application.

Figure 6:
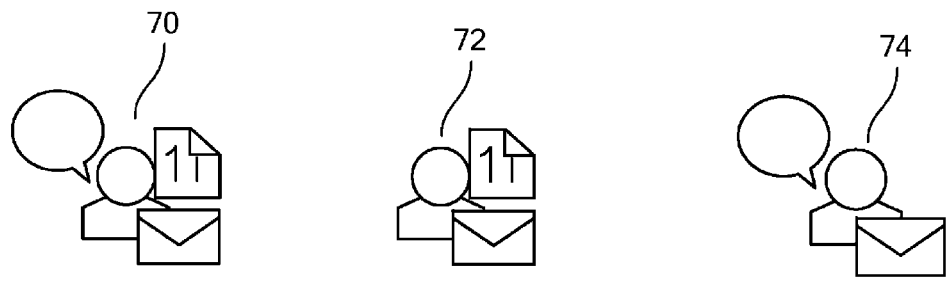
FIG. 6 shows examples of icons indicating multiple types of communication with the local user in an illustrative embodiment.

FIG. 6 shows examples of icons indicating multiple types of communication with the local user in an illustrative embodiment. The icon 70 is an example of an icon that may be displayed in proximity to an entry in the participant list for a collaboration session indicating that the user corresponding to that participant list entry is also an invitee to a meeting that the local user has scheduled in his or her electronic calendaring application, has communicated with the local user via an electronic mail application, and has also communicated with the local user through an instant messaging application. The icon 72 is an example of an icon that may be displayed in proximity to an entry in the participant list for a collaboration session indicating that the user corresponding to that participant list entry has communicated with the local user through an electronic mail application, and is also an invitee to a meeting that the local user has scheduled in his or her electronic calendaring application. The icon 74 is an example of an icon that may be displayed in proximity to an entry in the participant list for a collaboration session indicating that the user corresponding to that participant list entry has communicated with the local user through an instant messaging application and through an electronic mail application.

Figure 7:
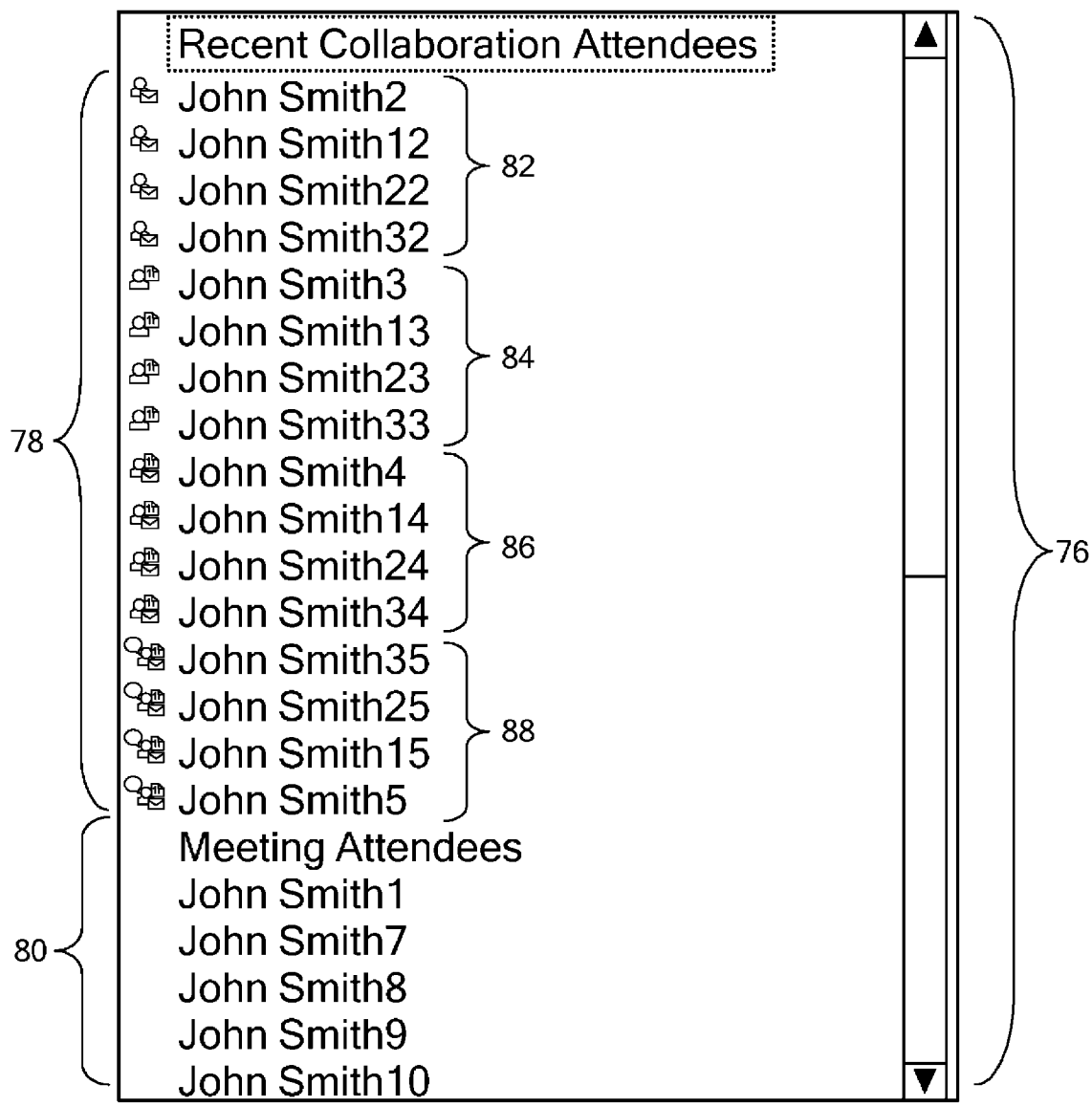
FIG. 7 is a simplified screen shot showing an example of a participant list user interface display in an illustrative embodiment.

FIG. 7 is a simplified screen shot showing an example of a participant list user interface display 76 in an illustrative embodiment. As shown in FIG. 7, a visually distinct section 78 located at the beginning of the participant list contains participant entries corresponding to users with whom the local user has communicated through applications external to the collaboration application providing the current collaboration session. The portion 80 of the participant list following the visually distinct section 78 contains either the complete set of participants in the current session, or all participants other than those listed in the visually distinct section 78.

In the example of FIG. 7, the visually distinct section 78 of the participant list is organized such that participants are grouped according to which external communication application(s) they have used to communicate with the local user. At the top of the visually distinct section 78 of the participant list is a sub-section 82 containing entries for those participants that have communicated with the local user through an electronic mail application. A sub-section 84 contains entries for participants that are invitees to calendar events in the local user's electronic calendar. A sub-section 86 contains entries for participants that are both invitees to calendar events in the local user's electronic calendar, and that have communicated with the local user through an electronic mail application, and a sub-section 88 contains entries for participants that are invitees to calendar events in the local user's electronic calendar, have communicated with the local user through an electronic mail application, and have communicated with the local user through an instant messaging application. The participant entries within each of the subsets 82, 84, 86 and 88 may, for example, be arranged in order of the total number of communications and scheduled events with the local user, or in some other manner, or based on a user configurable setting. Moreover, the order of the subsets 82, 84, 86 and 88 is only for purposes of illustration, and the specific order of such sub-sections may be different in other embodiments, and/or determined based on a user configurable setting.

FIG. 8 is an example of a user interface 100 for an electronic mail application in an illustrative embodiment. As shown in FIG. 8, a number of entries 102 correspond to messages (e.g. received messages) in an electronic mail system mail box (e.g. an Inbox for the local user). A row 106 of selectable column identifiers allows the local user to control the order in which the message entries 102 are displayed. For example, as shown in the example of FIG. 8, the column identifier 110 is currently selected, causing the entries 102 to be ordered based on date (e.g. the date the messages were received). Alternatively, the local user may select the column identifier 108 to cause the entries 102 to be ordered based on sending user (e.g. in alphabetical order), the column identifier 112 to cause the entries 102 to be ordered based on time (e.g. the time the messages were received), or the column identifier 114 to cause the entries 102 to be ordered based on subject. In the disclosed system, a selectable column identifier 115 may also be provided in the row 106 which, when selected by the local user, causes the entries to be arranged such that those entries associated with users that are current participants in a collaboration session provided by the collaboration application are listed at the top.

Further in the list of entries 102, the entries 104 each have located adjacent to them icons visually indicating that the users associated with those entries (e.g. the users that sent the messages), are currently participants in the collaboration session provided by the collaboration session application. The icons in the column 116 are thus visually indicative of whether the associated users for those entries are current participants in the collaboration session, and accordingly selecting the column identifier 115 effectively sorts the entries 102 based on the icons in the column 116, with entries associated with users that are current collaboration session participants located at the top.

Figure 9:
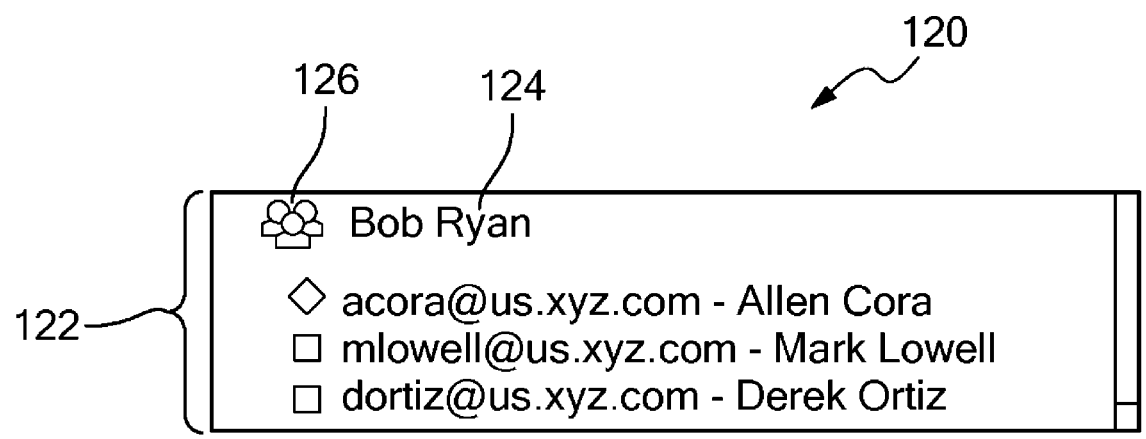
FIG. 9 is a simplified screen shot showing a portion of a chat session participant entry list in an illustrative embodiment.

FIG. 9 is a simplified screen shot showing a portion 120 of a chat session participant entry list 122 in an illustrative embodiment. Each entry in the list 122 identifies an associated user with which the local user is having a chat session. As shown in FIG. 9, the entry 124 has located adjacent to it an icon 126 visually indicating that the user associated with the entry 124 ("Bob Ryan") is currently participating in a collaboration session with the local user through a collaboration application to which the instant messaging application is an external application.

FIG. 10 is a simplified screen shot showing an entry 130 from within a list of calendar entries in an electronic calendar application user interface. As shown in FIG. 10, the entry 130 represents a meeting from 9:00 to 10:00. The meeting represented by the entry 130 was scheduled by the user 132 ("Bob Ryan"). An icon 134 displayed next to the name of the user 132 indicates that that user is currently a participant in a collaboration session provided by a collaboration application to which the calendaring application is an external application.

FIG. 11 is a simplified screen shot showing an entry 139 from within a list of calendar entries in an electronic calendar application user interface. As shown in FIG. 11, a number of users are required for a meeting, and these required users are listed in the field 140. The user name 142 ("bbonds@xyz.com") has located adjacent to it an icon 144 indicating that that user is currently a participant in a collaboration session provided by a collaboration application to which the electronic calendaring application is an external application.

In the above description the term "local user" is sometimes used to describe a specific computer system user, but this term is not intended in a limiting sense, and the disclosed system is not limited to any specific type of user in this regard. Accordingly, where the term "local user" is used herein, any specific type of user may be included. For example, the term "local user" may describe any currently consuming user with regard to a collaboration session application, and other users with respect to such local user may accordingly include any or all other participants in a current collaboration session.

While in the above description icons have been used to provide visual indications of specific conditions, the present invention is not limited to embodiments using those specific icons, or even to embodiments using icons in general. Accordingly, those skilled in the art will recognize that the visual indications provided by embodiments of the disclosed system may be provided in any specific way that is appropriate for the specific embodiment.

Moreover, while the above description regarding illustrative embodiments of the disclosed system includes examples of specific user interface display objects, such as graphical buttons, menus, dialog boxes, and the like, the present invention is not limited to those specific examples. Accordingly, those skilled in the art will recognize that alternative embodiments may use any specific type or kind of user interface display object that may be appropriate.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for providing user interfaces to a local user of a computer system, comprising:

displaying a collaboration session participant list in a user interface for a collaboration application providing a collaboration session to said local user, wherein said collaboration session participant list includes a visually separate section containing only participants in said collaboration session that have communicated with said local user through at least one application external to a collaboration application providing said collaboration session to said local user.

2. The method of claim 1, wherein said visually separate first section is located at a top portion of said collaboration participant list.

3. The method of claim 1, wherein said at least one application external to said collaboration application providing said collaboration session to said local user comprises at least one of the group consisting of electronic mail, calendaring, and instant messaging.

4. The method of claim 1, wherein said collaboration application is a Web conferencing application.

5. The method of claim 1, wherein each user name in said visually separate section containing only participants that have communicated with said local user through at least one application external to said collaboration application has associated with it at least one communication mode indication, wherein each communication mode indication indicates a type of an application external to said collaboration application through which the participant communicated with said local user.

6. The method of claim 1, further comprising:
 displaying a list of entries in a user interface to an application external to said collaboration application, wherein said list of entries includes current collaboration indications in proximity to each entry associated with a current participant in said collaboration session.

7. The method of claim 6, wherein said list of entries in said user interface to said application external to said collaboration application comprises one of the group consisting of a list of electronic mail messages, a list of electronic calendar entries, and a list of instant messaging session participants.

8. A system for providing user interfaces to a local user of a computer system, comprising:
 collaboration application user interface display logic for displaying a collaboration session participant list in a user interface for a collaboration application providing a collaboration session to said local user, wherein said collaboration session participant list includes a visually separate section containing only participants in said collaboration session that have communicated with said local user through at least one application external to a collaboration application providing said collaboration session to said local user.

9. The system of claim 8, wherein said visually separate first section is located at a top portion of said collaboration participant list.

10. The system of claim 8, wherein said at least one application external to said collaboration application providing said collaboration session to said local user comprises at least one of the group consisting of electronic mail, calendaring, and instant messaging.

11. The system of claim 8, wherein said collaboration application is a Web conferencing application.

12. The system of claim 8, wherein each user name in said visually separate section containing only participants that have communicated with said local user through at least one application external to said collaboration application has associated with it at least one communication mode indication, wherein each communication mode indication indicates a type of an application external to said collaboration application through which the participant communicated with said local user.

13. The system of claim 8, further comprising:
 external application user interface display logic for displaying a list of entries in a user interface to an application external to said collaboration application, wherein said list of entries includes current collaboration indications in proximity to each entry associated with a current participant in said collaboration session.

14. The system of claim 13, wherein said list of entries in said user interface to said application external to said collaboration application comprises one of the group consisting of a list of electronic mail messages, a list of electronic calendar entries, and a list of instant messaging session participants.

15. A computer program product including a computer readable memory, wherein said computer readable memory has stored thereon program code operable when executed to cause a computer system to:
 display a collaboration session participant list in a user interface for a collaboration application providing a collaboration session to said local user, wherein said collaboration session participant list includes a visually separate section containing only participants in said collaboration session that have communicated with said local user through at least one application external to a collaboration application providing said collaboration session to said local user.

16. The computer program product of claim 15, said program code operable when executed to further cause said computer system to:
 display a list of entries in a user interface to an application external to said collaboration application, wherein said list of entries includes current collaboration indications in proximity to each entry associated with a current participant in said collaboration session.

\* \* \* \* \*